United States Patent [19]

Estes et al.

[11] Patent Number: 4,537,409
[45] Date of Patent: Aug. 27, 1985

[54] RADIAL ROCK BIT SEAL

[75] Inventors: Roy D. Estes, Weatherford; Beaumont B. Wright, Fort Worth, both of Tex.

[73] Assignee: Rock Bit Industries U.S.A., Inc., Fort Worth, Tex.

[21] Appl. No.: 592,182

[22] Filed: Mar. 22, 1984

[51] Int. Cl.³ .............................................. F16J 15/24
[52] U.S. Cl. ...................................... 277/83; 277/84; 277/92; 277/95; 277/166
[58] Field of Search .................. 277/12, 32, 81 R, 82, 277/83, 84, 92, 95, 165, 166, 177, 186, 189

[56] References Cited

U.S. PATENT DOCUMENTS

| | | | |
|---|---|---|---|
| 3,389,760 | 6/1968 | Morris | 277/12 X |
| 3,462,159 | 8/1969 | Baumann et al. | 277/83 X |
| 3,944,306 | 3/1976 | Neilson | 277/95 X |
| 4,344,629 | 8/1982 | Oelke | 277/84 X |

FOREIGN PATENT DOCUMENTS

| | | | |
|---|---|---|---|
| 872707 | 4/1953 | Fed. Rep. of Germany | 277/95 |
| 949857 | 2/1964 | United Kingdom | 277/95 |

*Primary Examiner*—Robert S. Ward
*Attorney, Agent, or Firm*—L. Dan Tucker

[57] ABSTRACT

An improved radial rock bit seal for utilization with earth boring drill bits which employ rolling cutters mounted on shafts extending from face surfaces on the drill bit body. The improved seal includes a cylindrical body which is disposed around each shaft and which has two axially displaced seal portions. The first seal portion includes an elastomeric sealing surface which is disposed in sealing and sliding engagement with the shaft. The second seal portion includes an elastomeric sealing surface which is disposed in sealing and sliding engagement with the rolling cutter. A flexible juncture between each of the two seal portions permits the seal portions to move somewhat independently in response to loading of the rolling cutter and this permits both seals to maintain substantially the same seal compression in spite of such loading. In a preferred embodiment of the present invention, a rigid ring is utilized in conjunction with the elastomeric sealing surface that contacts the rolling cutter and is sized to maintain a selected amount of compression on the elastomeric sealing surface that contacts the inner surfaces of the cutter and an additional ring is used in conjunction with the elastomeric sealing surface that contacts the shaft so as to center the seal around the shaft and to cause the elastomeric sealing surface to form a seal around the shaft.

21 Claims, 4 Drawing Figures

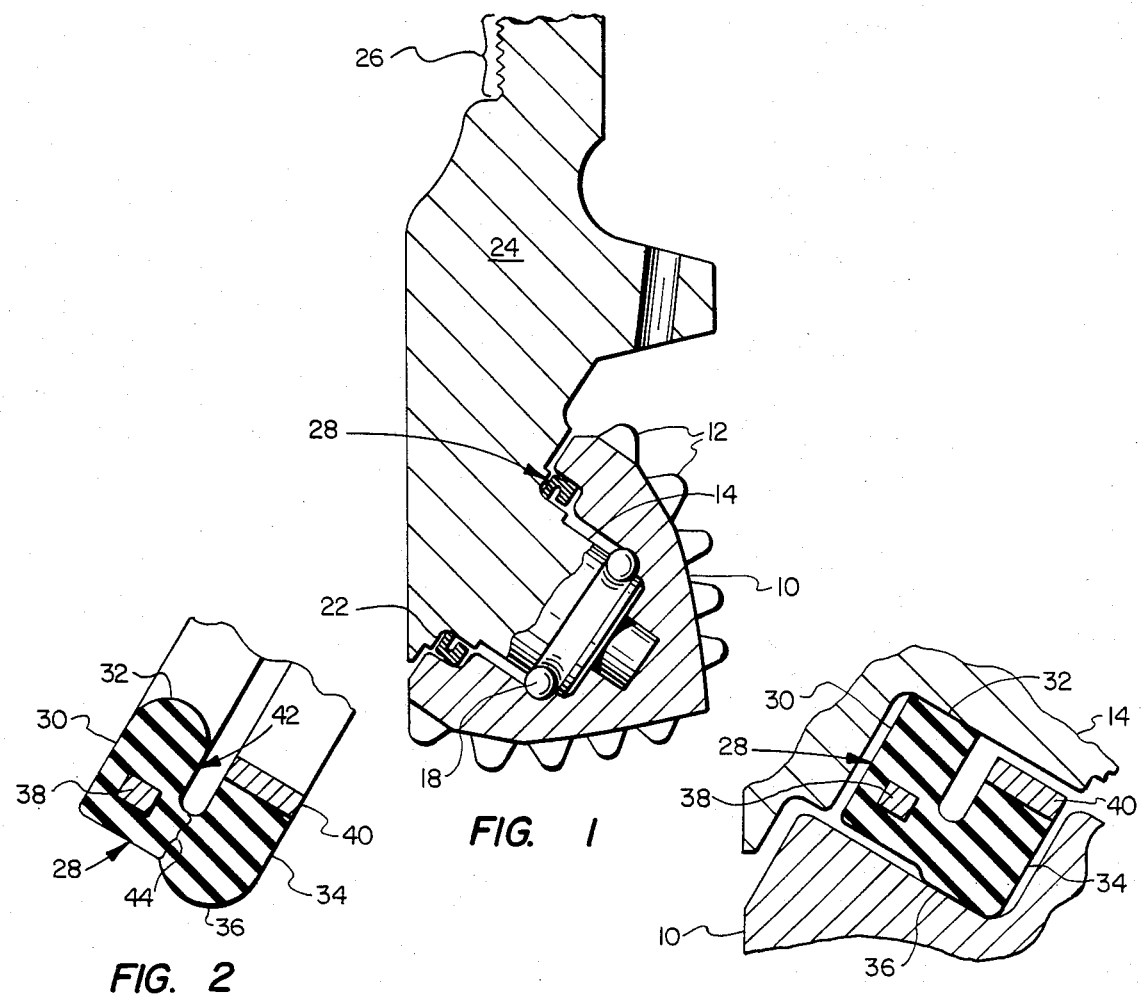
FIG. 1
FIG. 2
FIG. 3
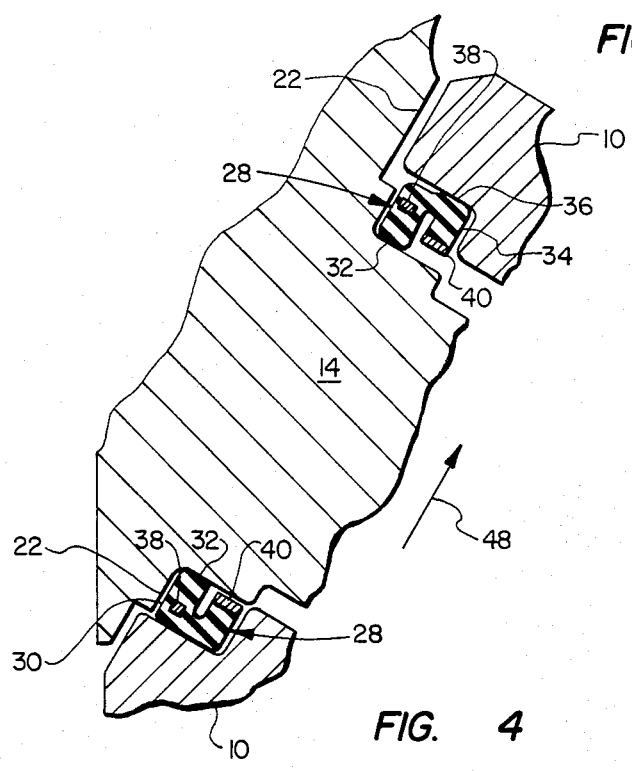
FIG. 4

RADIAL ROCK BIT SEAL

BACKGROUND OF THE INVENTION

This invention relates in general to improved seals for drill bit bearings and in particular to seals which resist deformation and distortion in response to increased loading.

Earth-boring drill bits, such as are typically employed in the petrochemical industry for drilling oil or gas wells, are rugged pieces of equipment which must operate in very severe environments. In such operations, a drill bit is typically threaded on to a section of pipe and lowered into a well bore wherein it is rotated for the purpose of cutting through rock and earth formations. Rotatable cutters are usually mounted on a shaftlike cutter support and the fragments of rock created by the operation of the rolling cutters are removed from the well bore utilizing a drilling fluid or "mud" solution. In prior art drill bits, several solutions have been proposed to inhibit the ingress of abrasive detritus into the bearings of the rolling cutter thereby permitting the rolling cutter to be operated over extended periods of time in this environment. One such solution to this problem has been the utilization of pressure equalized lubricant reservoirs which are operated by the pressures of the drilling fluid within the well bore and which serve to equalize the pressure of the lubricant with the exterior pressures around the bit to maintain lubricant on the bearing surfaces. This pressurized lubricant reservoir has been moderately successful in preventing the ingress of abrasive detritus into the bearing area; however, the pressure equalized lubricant reservoir does result in the egress of lubricants from the bearing area in greater amounts than is normally desired.

Another approach to the problem of preventing abrasive material from wearing away at the bearing surfaces has been the utilization of various ring sealing devices. An early example of this approach may be seen in U.S. Pat. No. 3,397,928, issued to Edward M. Galle. The Galle disclosure teaches the simple expedient of an elastomeric sealing ring which has been compressed between the inner face of the rolling cutter and the cutter shaft. Another example of a packing ring seal utilized in rotary drill bits may be seen in U.S. Pat. No. 3,656,764, issued to William P. Robinson. The Robinson drill bit seal assembly utilizes two elastomeric O-ring seals which are separated by a rigid ring which is utilized to seat the O-rings into opposing bearing surfaces. This utilization of a rigid ring allegedly provides an increase in accommodation of radial, axial and angular displacements over previously known O-ring seals. A third example of sealing ring devices can been seen in U.S. Pat. No. 3,137,508, issued to R. A. Cunningham. The Cunningham seal comprises a frusto-conical metallic ring which is lightly encapsulated with a resilient lubricant resistant material at those areas which form seals for rotating metal surfaces.

Each of these sealing mechanisms and pressure equalized lubrication systems is designed to prevent the ingress of abrasive detritus into the bearing support in the rolling cutters. This is necessary since it is most desirable to operate the drill bit for long periods of time between drill bit changes, due to the amount of manpower and time required to remove the drill stem from the well bore to replace the drill bit. Complicating this problem is the fact that fluctuations in position and pressure which are encountered by an earth-boring drill bit during operation are substantial and tend to displace the rolling cutter from the shaft upon which it is mounted. One method of sealing the bearing supporting drill bit rolling cutters which accommodate such displacements is the so-called "face" seal which is disposed between a surface of the rolling cutter and a face surface of the drill bit body. Such seals generally provide a similar compression whether loaded or unloaded and provide an excellent seal.

A second form of seal is the so-called "shaft" seal or radial seal which is disposed about each shaft on a drill bit body and which is then compressed radially. These seals provide an excellent method of preventing the ingress of abrasive detritus; however, the loading experienced by a rolling cone cutter often has a tendency to "load" or increase the compression on one side of the shaft and "unload" or decrease the seal compression on the other side of the shaft. Accordingly, there exists a need for a shaft seal which does not substantially change in compression and response to radial loading of the rolling cone cutters.

SUMMARY OF THE INVENTION

Therefore, it is one object of the present invention to provide an improved rotary seal for use in earth boring drill bits.

It is another object of the present invention to provide an improved rotary shaft seal for use in earth boring drill bits.

It is yet another object of the present invention to provide an improved rotary shaft seal for use in earth boring drill bits which is highly resistant to radial loading.

It is another object of the present invention to provide an improved rotary shaft seal for use in earth boring drill bits which provides increased effectiveness over known packing ring seals and drill bit bearings.

The foregoing objects are achieved as is now described. The improved seal of the present invention includes a cylindrical body which is disposed around each shaft of the drill bit body. The cylindrical body includes two axially displaced seal portions. The first seal portion includes a first elastomeric sealing surface which is disposed in sealing and sliding engagement with the shaft. The second portion includes a second elastomeric sealing surface which is disposed in sealing and sliding engagement with the rolling cutter. A flexible juncture between each of the two seal portions permits the seal portions to move somewhat independently in response to loading of the rolling cutters and thus permits both seals to maintain substantially the same seal compression in spite of such loading. In a preferred embodiment of the present invention, a first ring of relatively non-elastomeric material is utilized in conjunction with the first seal portion and is sized to maintain a selected amount of compression on said first seal portion so as to center the first seal portion around the shaft and to sealingly engage the shaft at the contact between the shaft and the first elastomeric sealing surface. It is also preferred to include a second ring of rigid material in conjunction with the second seal portion to maintain a selected amount of compression on the second seal portion so as to center the second seal portion inside the rolling cutter and to sealingly engage the inside of the rolling cutter at the contact between the inside of the cutter and the second elastomeric sealing surface.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 1 is a longitudinal sectional view through a drill bit rolling cutter together with its associated bearing shaft and support which illustrates the improved radial seal of the present invention;

FIG. 2 is an end view depicting a section of the improved radial seal of the present invention in its relaxed state;

FIG. 3 is a greatly enlarged sectional view of the improved radial seal of FIG. 1 in its compressed state;

FIG. 4 is an enlarged sectional view of the improved radial seal of FIG. 1 which demonstrates the seal's increased resistance to radial loading.

DETAILED DESCRIPTION OF THE INVENTION

With reference now to the figures and in particular with reference to FIG. 1, there is depicted a longitudinal sectional view through a drill bit rolling cutter, together with its associated bearing shaft and support, which illustrates the improved radial seal of the present invention. Rolling cutter 10 is depicted as including a plurality of cutting inserts such as 12, which may be constructed of tungsten carbide or other material known in the art. As is typical in this art, rolling cutter 10 is mounted on a shaft 14 by means of friction bearing 16 and ball bearings 18. Shaft 14 is formed on a face surface 22 of cutter support 24. Cutter support 24 includes a threaded portion 26 which is utilized for connection to a drill stem (not shown) in a manner typical in this art. Not depicted in FIG. 1, but present in all such drill bit systems, is a lubrication system, which may or may not be pressurized, which serves to lubricate the bearing surfaces on which rolling cutter 10 is mounted. Such lubrication systems normally have a lubricant reservoir, a pressure equalizer or compensator and various conduits or passages for maintaining lubricant on the bearing surfaces. Since such systems are well known in the art, they are not illustrated in the figures here. It is the egress of this lubricant and the ingress of detritus in drilling fluid which must be inhibited to promote increased operation of such drill bits. To this end, radial seal 28 is disposed between the lubricated bearing surfaces and the abrasive particles in the environment of the well bore.

Referring now to FIG. 2, there is depicted an end view of radial seal 28 of the present invention in its relaxed state. As can be seen in FIGS. 1 and 2, radial seal 28 comprises a generally cylindrical seal body which is disposed around shaft 14. Radial seal 28 includes a first seal portion 30 which includes an elastomeric sealing surface 32 which is adapted to be placed in sealing and sliding engagement with shaft 14. A second seal portion 34 which is axially displaced from seal portion 30 includes an elastomeric sealing surface 36 which is adapted to be placed in sealing and sliding engagement with the interior surface of rolling cutter 10. Radial seal 28 is preferably constructed utilizing any suitable elastomeric material such as butadiene acrylonitrile (BUNA N) rubber or any other suitable lubricant resistant elastomeric material that can be deformed under pressure. In a preferred embodiment of the present invention, an elastomeric material having a durometer hardness of between seventy and ninety is utilized. Also depicted in FIG. 2 are rings 38 and 40, the purpose of which will be explained in detail herein. Finally, it can be seen that a slot 42 is provided in radial seal 28 between seal portion 30 and seal portion 34. A narrow elastomeric portion 44 is thus created between seal portion 30 and seal portion 34 to provide a degree of flexibility unknown in prior art seals. This narrow elastomeric portion will allow seal portions 30 and 34 to move radially with respect to each other.

Referring now to FIG. 3, there is depicted a greatly enlarged sectional view of radial seal 28 of the present invention in its compressed state. As can be seen, a first seal portion 30 having a first elastomeric sealing surface 32 is engaged in sealing and sliding engagement with shaft 14 and a second seal portion 34 having a second elastomeric sealing surface 36 is engaged in sealing and sliding engagement with the inside surface of rolling cutter 10. An important feature of the preferred embodiment of the present invention includes the sizing of radial seal 28 and the incorporation of rings 38 and 40. Rings 38 and 40 are carefully sized to the outside diameter of shaft 14 and the inside diameter of rolling cutter 10 respectively. Ring 38 can be made of any non-elastomeric material such as metal, glass filaments, nylon filaments, hard plastics and the like. In a preferred embodiment, ring 38 will be made of some metallic material such as stainless steel. Continuous ring 38 functions to maintain the outer annular portion of seal portion 30 at a substantially constant radius even when the seal portion is slipped over shaft 14. Thus ring 38 will impart a squeeze on the inner annular portion of seal portion 30 and when such seal portion is slipped over shaft 14, seal surface 32 will tend to flatten out to form the desired seal. Thus, as those skilled in the art will appreciate, upon reference to this specification, ring 38 can be chosen to ensure that elastomeric sealing surface 32 engages the outside of shaft 14 with a precisely selected amount of compression around the entire circumference of shaft 14 to thereby have seal surface 32 sealingly engage shaft 14. Further, so long as the nonsealing side of seal portion 30 does not contact rolling cutter 10, no amount of displacement will alter the compression of elastomeric sealing surface 32 in its sealing and sliding engagement with shaft 14.

Ring 40 is a relatively rigid ring that functions to hold the inner annular portion of seal portion 34 at a substantially constant radius even when the seal portion is slipped inside cutter cone 10. Thus, rigid ring 40 will impart a squeeze on the outer annular portion of seal portion 34 and when such seal portion is slipped inside cutter cone 10, seal surface 36 will flatten out to form the desired seal. Rigid ring 40 can be made of any non-elastomeric material such as metal, ceramics, hard plastic and the like. Rigid ring 40 is sized to the interior diameter of rolling cutter 10 and will thus ensure that a precisely selected amount of compression is applied to elastomeric sealing surface 36 around the entire circumference of rolling cutter 10. Again, so long as rigid metallic ring 40 does not contact shaft 14, the selected compression of elastomeric sealing surface 36 will not be altered. The amount of compression of seal portions 30 and 34 can be any desired compression sufficient to provide suitable seal at seal surfaces 32 and 36. It has been found that such compression is usually less than that of prior art seals. In a preferred embodiment of the present invention, elastomeric sealing surfaces 32 and 36 are both compressed less than ten percent of their relaxed radial dimensions as depicted in FIG. 2.

By providing the precise compression permitted by rigid metallic rings 38 and 40, and by linking seal portion 30 with seal portion 34 utilizing flexible elastomeric portion 44, the problem of unequal loading of radial seal 28 can be substantially eliminated. Prior art shaft seals have typically required a high degree of compression on the seal due to the fact that one side of the seal experiences greater compression when loaded and the other side of the seal experiences a decrease in compression due to unloading. Prior to the seal design depicted herein, the amount of compression necessary in prior art seals was required to be above a selected point to ensure that the sealing effect was not lost on the unloaded side. The manner in which this problem is solved in the present invention is illustrated in FIG. 4 which depicts an enlarged sectional view of radial seal 28 which demonstrates the response of radial seal 28 to unequal loading of rolling cutter 10.

Referring now to FIG. 4, the response of radial seal 28 to loading on rolling cutter 10 in the direction of arrow 48 is illustrated. In prior art seals, such a loading force would greatly increase the compression on the lower half of radial seal 28 while decreasing the compression half of radial seal 28. As can be seen, as rolling cutter 10 moves in the direction of arrow 48, (greatly exaggerated for illustration purposes) rigid metallic ring 40 moves with rolling cutter 10, maintaining a selected amount of compression on elastomeric sealing surface 36 around the entire inner circumference of rolling cutter 10. Similarly, ring 38 maintains a precise amount of compression on elastomeric sealing surface 32, around the entire circumference of shaft 14. The flexible juncture formed by elastomeric portion 44 permits seal portion 30 and seal portion 34 to move independently, thus creating a radial seal which exhibits a constant selected compression against shaft 14 and rolling cutter 10, despite variations in the loading and positioning of rolling cutter 10. Thus, the seal structure of this invention provides for a self centering effect wherein seal portion 30 remains centered around shaft 14 while seal portion 34 remains centered in the interior circumference of cutter cone 10 even when there is a loading of the bit as explained above. It will be noted that this seal structure is self compensating under varying loadings and even when there are eccentricities on the surfaces of the bit to be sealed.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. For example, the positions of seal portions 30 and 34 can be reversed. It will also be appreciated that while the seal structure of the invention has been illustrated as being especially useful in drill bits, such seal structures can also be used in other types of equipment wherein various rotating shafts are sealed. It is therefore contemplated that the appended claims will cover any such modifications or embodiments that fall within the true scope of the invention.

What is claimed is:

1. A rotary seal for utilization with an earth boring drill bit having a drill bit body with a shaft rigidly mounted on a face surface thereof and a rolling cutter rotatably mounted on such shaft, said seal comprising:
   a circular seal body adapted to be mounted around said shaft, said circular seal body including;
      a first seal portion having a first elastomeric surface in sealing and sliding engagement with said shaft;
      a second seal portion axially displaced from said first seal portion with respect to said shaft, having a second elastomeric surface in sealing and sliding engagement with said rolling cutter; and
      a flexible juncture joining said first seal portion and said second seal portion wherein displacement of said rolling cutter will have minimal effect on said sealing and sliding engagement of said first elastomeric surface with said shaft.

2. The rotary seal according to claim 1 wherein said first elastomeric surface and said second elastomeric surface are constructed of rubber having a durometer hardness of between seventy and ninety.

3. The rotary seal according to claim 1 wherein said flexible juncture comprises a third portion of said circular seal body of substantially narrower thickness than said first seal portion and said second seal portion.

4. The rotary seal according to claim 3 wherein said flexible juncture is constructed of rubber having a durometer hardness of between seventy and ninety.

5. The rotary seal according to claim 1 wherein said cylindrical seal body is sized such that upon assembly of said rolling cutter onto said shaft, said first elastomeric surface is compressed less than ten percent of its relaxed radial dimension.

6. The rotary seal according to claim 5 wherein said cylindrical seal body is sized such that upon assembly of said rolling cutter onto said shaft, said second elastomeric surface is compressed less than ten percent of its relaxed radial dimension.

7. A rotary seal for utilization with an earth boring drill bit having a drill bit body with a shaft rigidly mounted on a free surface thereof and a rolling cutter rotatably mounted on said shaft, said seal comprising:
   a circular seal body adapted to be mounted around said shaft, said circular seal body including;
      a first seal portion having a first elastomeric surface in sealing and sliding engagement with said shaft;
      a second seal portion axially displaced from said first seal portion with respect to said shaft, having a second elastomeric surface in sealing and sliding engagement with said rolling cutter;
      a flexible juncture joining said first seal portion and said second portion wherein displacement of said rolling cutter will have minimal effect on said sealing and sliding engagement of said first elastomeric surface with said shaft; and
      means for maintaining a selected amount of compression between said first elastomeric surface and said shaft about the entire circumference of said shaft.

8. The rotary seal according to claim 7 wherein said first elastomeric surface and said second elastomeric surface are constructed of rubber having a durometer hardness of between seventy and ninety.

9. The rotary seal according to claim 7 wherein said flexible juncture comprises a third portion of said circular seal body of substantially narrower thickness than said first seal portion and said second seal portion.

10. The rotary seal according to claim 9 wherein said flexible juncture is constructed of rubber having a durometer hardness of between seventy and ninety.

11. The rotary seal according to claim 7 wherein said cylindrical seal body is sized such that upon assembly of said rolling cutter onto said shaft, said second elastomeric surface is compressed less than ten percent of its relaxed radial dimension.

12. The rotary said according to claim 7 wherein said means for maintaining a selected amount of compression between said first elastomeric surface and said shaft comprises a ring of non-elastomeric material encompassing said first elastomeric surface.

13. The rotary seal according to claim 12 wherein said selected amount of compression comprises less than ten percent of the relaxed radial dimension of said first elastomeric surface.

14. The rotary seal according to claim 7 further including means for maintaining a selected amount of compression between said second elastomeric surface and said rolling cutter.

15. The rotary seal according to claim 14 wherein said means for maintaining a selected amount of compression between said second elastomeric surface and said rolling cutter comprises a rigid ring of non-elastomeric material encompassing said second elastomeric surface.

16. A rotary seal for utilization with an earth boring drill bit having a drill bit body with a shaft rigidly mounted on a face surface thereof and a rolling cutter rotatably mounted on said shaft, said seal comprising:
a circular seal body adapted to be mounted around said shaft, said circular seal body including;
a first seal portion having a first elastomeric surface in sealing and sliding engagement with said shaft;
a second seal portion axially displaced from said first seal portion with respect to said shaft, having a second elastomeric surface in sealing and sliding engagement with said rolling cutter;
a flexible juncture joining said first seal portion and said second seal portion wherein displacement of said rolling cutter will have minimal effect on said sealing and sliding engagement of said first elastomeric surface with said shaft; and
means for maintaining a selected amount of compression between said second elastomeric surface and said rolling cutter.

17. The rotary seal according to claim 16 wherein said first elastomeric surface and said second elastomeric surface are constructed of rubber having a durometer hardness of between seventy and ninety.

18. The rotary seal according to claim 16 wherein said flexible juncture comprises a third portion of said circular body of substantially narrower thickness than said first seal portion and said second seal portion.

19. The rotary seal according to claim 18 wherein said flexible juncture is constructed of rubber having a durometer hardness of between seventy and ninety.

20. The rotary seal according to claim 16 wherein said cylindrical seal body is sized such that upon assembly of said rolling cutter onto said shaft, said first elastomeric surface is compressed less than ten percent of its relaxed radial dimension.

21. The rotary seal according to claim 16 wherein said means for maintaining a selected amount of compression between said second elastomeric surface and said rolling cutter comprises a rigid ring encompassing said second elastomeric surface.

* * * * *